United States Patent
Kakichi et al.

[15] 3,642,225
[45] Feb. 15, 1972

[54] DEVICE FOR DETECTING THE COMPLETION OF FILM WINDING

[72] Inventors: Tokusaburo Kakichi; Hideaki Akiyama, both of Tokyo, Japan

[73] Assignee: Kabushiki Kaisha Ricoh, Tokyo, Japan

[22] Filed: May 27, 1969

[21] Appl. No.: 828,140

[30] Foreign Application Priority Data

June 3, 1968  Japan..................................43/46370

[52] U.S. Cl...............................242/189, 242/57, 242/199
[51] Int. Cl................B65h 25/04, B65h 63/08, G11b 23/10
[58] Field of Search....................242/57, 197, 198, 199, 200, 242/71.1, 71.2; 352/72, 78; 116/114.10

[56] References Cited

UNITED STATES PATENTS

| | | | |
|---|---|---|---|
| 1,964,874 | 7/1934 | Fankboner | 242/57 |
| 3,458,157 | 7/1969 | Wells | 242/57 |

OTHER PUBLICATIONS

Hummel, German Printed Application 1,142,069 Published 1-1963 242/198

*Primary Examiner*—George F. Mautz
*Attorney*—Burgess, Ryan and Wayne

[57] ABSTRACT

A device for detecting the film-winding completion and giving tension to the film for film cartridge in which a spring for normally imparting tension to the film extending between a pair of spools is made integral with a lever one portion of which is adapted to be extended out of the film cartridge upon completion of the film winding.

1 Claims, 2 Drawing Figures

INVENTORS
TOKUSABURO KAKIUCHI
HIDEAKI AKIYAMA
BY
Burgess, Ryan & Hicks
ATTORNEYS

DEVICE FOR DETECTING THE COMPLETION OF FILM WINDING

BACKGROUND OF THE INVENTION

The present invention relates to an improved film cartridge for use in a projector or the like and more particularly a device which indicates the completion of the film winding.

When the sprocket system is employed in the film cartridges, the movie cameras, projectors and so on become generally very expensive because of the construction of the sprocket system. Therefore, there have been proposed various systems for eliminating the sprocket, but so far this problem has not been satisfactorily solved. For example, in some systems the force applied to the film from the film driving or transporting mechanism is too great and stabilized pictures are not obtained.

Furthermore, there has not been proposed a device which indicates the completion of film winding.

The present invention has therefore for its object to provide a device simple in construction which can completely eliminate said defects and stabilize the pictures and positively indicate the completion of the film winding.

SUMMARY OF THE INVENTION

In brief, the present invention provides a device for film cartridge for detecting the film-winding completion and imparting tension to the film in which the excess tension imparted to the film when the rotation of the spool becomes nonuniform for some reasons may be absorbed by the spring and the signal indicating the completion of the film winding can be derived when the supply spool is emptied.

According to one embodiment of the present invention, the base portion of a substantially U-shaped spring is secured to a pivot and one arm of this spring carries a roller at its leading end. The film wound around the supply and takeup spools and lapped over the roller is imparted with tension from the spring. One end of a lever also pivoted to said pivot is made integral with the spring. When the film is being transported, that is when the supply spool is not emptied, the other end of the lever is retracted within a film cartridge, but when the film is all wound around the takeup spool and the tension applied to the film is increased in excess of the force of the spring, the one arm of the spring is bent so that the lever in unitary construction with the spring is caused to rotate, thereby extending the other end thereof out of the film cartridge for indicating the completion of the film winding.

The above-described U-shaped spring normally serves to impart tension to the film and to absorb the excess tension applied thereto by bending its one arm so that the smooth transportation of the film can be always ensured and the vibrations of the pictures can be also eliminated.

The above and other objects, features and advantages of the present invention will become more apparent from the following description taken in conjunction with the accompanying drawing.

DESCRIPTION OF THE PREFERRED EMBODIMENT

Figure 1:
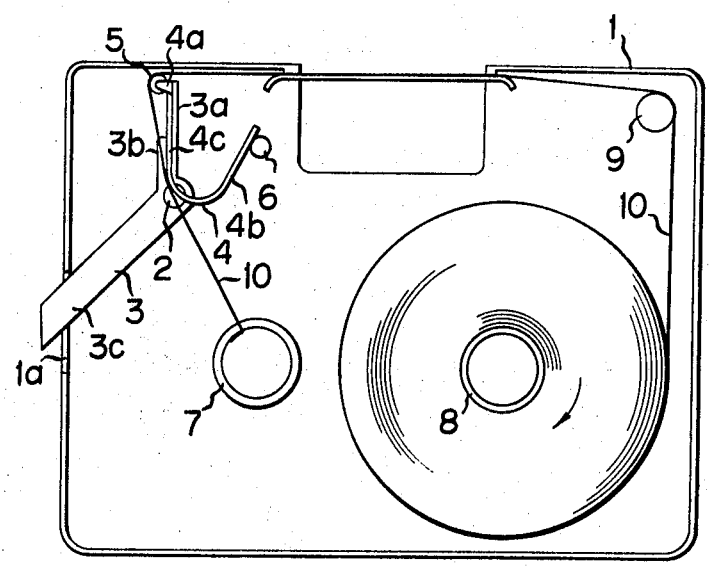
FIG. 1 is a plan view of a film cartridge with a cover being moved away of one preferred embodiment of the present invention showing the completion of film winding.
Figure 2:
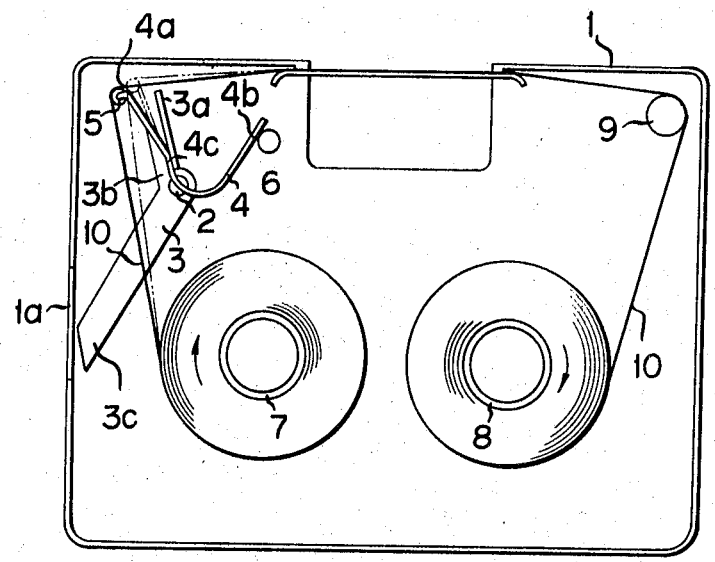
FIG. 2 is a plan view similar to FIG. 1 but showing the film being transported.

To a pivot 2 within a film cartridge 1 provided with a detecting hole 1a is pivoted a bifurcated detecting lever 3 having an arm 3b having a protrusion 3a and another arm 3c adapted to be extended outwardly of the film cartridge 1 through the detecting hole 1a. To the protrusion 3a of the detecting lever 3 is securely fixed the intermediate portion 4c of a spring 4 whose one end carries a roller 5 and whose other end is made to abut against a pin 6 so that the detecting lever 3 is imparted with a tendency to normally rotate in the counterclockwise direction in the figure. A film 10 lapping over the roller 5 and another roller 9 is wound around a supply and takeup spools 7 and 8.

The film 10 is normally imparted with tension by the roller 5 of the spring 4 sufficiently enough to adapt the variation in speed of rotation of the spools 7 and 8, and vibrations caused by the intermittent movement of the film 10 are sufficiently absorbed by the spring 4 so that the smooth movement of the film 10 may be ensured. When the film 10 is completely wound up around the takeup spool 8 while the supply spool 7 is emptied, the film 10 presses the protrusion 3a of the detecting lever 3 through the roller 5 against the spring 4 so that the detecting lever 3 is caused to rotate in the clockwise direction, thereby advancing the arm 3c of the detecting lever 3 through the film-detecting hole 1a out of the film cartridge 1. Thus, the end of film winding is indicated. Furthermore, the signal indicating the end of film winding may be fed back to a film drive means so that upon completion of the film winding around the takeup spool 8 the film drive means and both of the spools 7 and 8 may be stopped.

We claim:

1. A device for indicating the completion of film winding comprising:
   a film cartridge housing having an opening therein;
   a pair of supply and takeup spools mounted in said housing for film to be wound therebetween;
   a lever having an intermediate portion that is pivotally mounted within said housing, said lever having first and second arms extending respectively outwardly in opposite directions from the pivot portion;
   said first arm normally positioned completely within said housing when the film is being wound;
   said second arm having a protruding portion extending therefrom;
   a U-shaped spring mounted in said housing and having an intermediate portion and two leg portions;
   said spring intermediate portion fixed to said protruding portion;
   a fixed pin mounted in said housing;
   one leg portion abutting said fixed pin and the other leg portion having a roller mounted on the end thereof for the film to pass therearound;
   said spring exerting a rotating force on said protruding portion tending to maintain said first arm in its normal position; and
   said first arm movable to an indicating position upon winding completion whereby the end thereof projects through said opening as the tension of the stopped film exerts a force on said roller opposing said rotary force.

* * * * *